United States Patent
Meyles et al.

(10) Patent No.: US 9,870,415 B2
(45) Date of Patent: Jan. 16, 2018

(54) SYSTEM AND METHOD FOR FAST QUERY RESPONSE

(71) Applicant: IMS Health Incorporated, Danbury, CT (US)

(72) Inventors: Stephen Meyles, Seattle, WA (US); Derek Slager, Seattle, WA (US)

(73) Assignee: Quintiles IMS Incorporated, Danbury, CT (US)

( * ) Notice: Subject to any disclaimer, the term of this patent is extended or adjusted under 35 U.S.C. 154(b) by 424 days.

(21) Appl. No.: 14/057,712

(22) Filed: Oct. 18, 2013

(65) Prior Publication Data
US 2015/0081658 A1 Mar. 19, 2015

Related U.S. Application Data

(60) Provisional application No. 61/879,476, filed on Sep. 18, 2013.

(51) Int. Cl.
*G06F 17/30* (2006.01)

(52) U.S. Cl.
CPC .. *G06F 17/30578* (2013.01); *G06F 17/30457* (2013.01); *G06F 17/30501* (2013.01)

(58) Field of Classification Search
CPC ......... G06F 17/30424; G06F 17/30442; G06F 17/30448; G06F 17/30457; G06F 17/30501; G06F 17/30578
USPC ........................................................ 707/706
See application file for complete search history.

(56) References Cited

U.S. PATENT DOCUMENTS

| 6,484,161 | B1* | 11/2002 | Chipalkatti et al. |
| 6,865,567 | B1* | 3/2005 | Oommen .......... G06F 17/30463 |
| 2004/0039798 | A1* | 2/2004 | Hotz ................... H04L 61/1511 709/219 |
| 2004/0236726 | A1 | 11/2004 | Ewing et al. |
| 2008/0040317 | A1* | 2/2008 | Dettinger et al. ................ 707/3 |
| 2009/0077011 | A1* | 3/2009 | Natarajan ......... G06F 17/30501 |
| 2009/0319486 | A1* | 12/2009 | Surlaker et al. .................. 707/3 |

(Continued)

OTHER PUBLICATIONS

Goldstein, J., et al., "Optimizing Queries Using Materialized Views: A Practical, Scalable Solution", May 21, 2001, pp. 1-12, XP002548432.

(Continued)

*Primary Examiner* — James Trujillo
*Assistant Examiner* — Jessica N Le
(74) *Attorney, Agent, or Firm* — Fish & Richardson P.C.

(57) ABSTRACT

The disclosure generally describes computer-implemented methods, software, and systems for handling data access request, including: receiving a request submitted by a user to access data entries stored at a primary data server; determining whether the received request is supported by a fast query service engine, the fast query service engine being different from the primary data server; in response to determining that the received request is supported by the fast query service engine, directing the request to the fast query service engine; receiving query results from the fast query service engine, the query results composed from more than one answer sets maintained in in-memory data store at the fast query service engine, the answer sets the in-memory data-store being synchronized with the primary data server; and providing the query results to the user submitting the request.

18 Claims, 7 Drawing Sheets

(56) References Cited

U.S. PATENT DOCUMENTS

2011/0202560 A1* 8/2011 Bowers ............ G06F 17/30401
　　　　　　　　　　　　　　　　　　　　　707/773
2013/0159283 A1　6/2013 Broll et al.
2014/0143501 A1* 5/2014 Creamer ............ G06F 17/3048
　　　　　　　　　　　　　　　　　　　　　711/136

OTHER PUBLICATIONS

European Search Report dated Feb. 5, 2015 from corresponding European Patent Application No. 14184943.0, 8 pages.
Office Action in European Application No. 14184943.0, dated Mar. 29, 2016, 7 pages.

* cited by examiner

FIG. 4B

You are viewing: root_[app]nfo@cal.com (Area 1)

Use the form below to edit an existing machine entry. Back to services.

MachineGroupId 8
Ip 10.0.1.99
Access ReadWrite
Type FastFindServer
Save Changes

If you're absolutely reckless, you may also Delete this machine entry. This could orphan service records and cause an outage. Please exercise caution!

FIG. 4C

SYSTEM AND METHOD FOR FAST QUERY RESPONSE

BACKGROUND

A user may submit data access requests to a database and may obtain query results.

OVERVIEW

In one aspect, some implementations provide a computer-implemented method for handling data access request, including: receiving a request submitted by a user to access data entries stored at a primary data server; determining whether the received request is supported by a fast query service engine, the fast query service engine being different from the primary data server; in response to determining that the received request is supported by the fast query service engine, directing the request to the fast query service engine; receiving query results from the fast query service engine, the query results composed from more than one answer sets maintained in in-memory data store at the fast query service engine, the answer sets the in-memory data-store being synchronized with the primary data server; and providing the query results to the user submitting the request.

Implementations may include one or more of the following features. In one configuration, determining whether the received request is supported by the fast query service may include decomposing the received request into logic query segments; and determining whether corresponding answer sets of the decomposed logic query segments are maintained in in-memory data storage at the fast query service engine. Decomposing the received request may include: decomposing the received request into logic query segments nested by at least one conjunctive. Decomposing the received request may include: decomposing the receive request into logic query segments nested by at least one disjunctive. Decomposing the received request may include: decomposing the receive request into logic query segments nested by at least one negation.

In one configuration, the method may additionally include: in response to determining that the request is not supported by the fast query service engine, directing the request to the primary data server. The method may further include: determining whether the request modifies data on the primary data server. Moreover, the method may include in response to determining that the request modifies data on the primary data server, notifying the fast query service engine that contents of answer set referencing the modified data, as maintained in in-memory data store at the fast query service engine, has become invalid.

In another aspect, some implementations may provide a computer system, comprising at least one processor, wherein the at least one processor is configured to perform the operations of: receiving a request submitted by a user to access data entries stored at a primary data server; determining whether the received request is supported by a fast query service engine, the fast query service engine being different from the primary data server; in response to determining that the received request is supported by the fast query service engine, directing the request to the fast query service engine; receiving query results from the fast query service engine, the query results composed from more than one answer sets maintained in in-memory data store at the fast query service engine, the answer sets the in-memory data-store being synchronized with the primary data server; and providing the query results to the user submitting the request.

Implementations may include one or more of the following features. In one configuration, determining whether the received request is supported by the fast query service may include decomposing the received request into logic query segments; and determining whether corresponding answer sets of the decomposed logic query segments are maintained in in-memory data storage at the fast query service engine. Decomposing the received request may include: decomposing the received request into logic query segments nested by at least one conjunctive. Decomposing the received request may include: decomposing the receive request into logic query segments nested by at least one disjunctive. Decomposing the received request may include: decomposing the receive request into logic query segments nested by at least one negation.

In one configuration, the operations may additionally include: in response to determining that the request is not supported by the fast query service engine, directing the request to the primary data server. The operations may further include: determining whether the request modifies data on the primary data server. Moreover, the operations may include in response to determining that the request modifies data on the primary data server, notifying the fast query service engine that contents of answer set referencing the modified data, as maintained in in-memory data store at the fast query service engine, has become invalid.

In yet another aspect, some implementations may provide a computer-readable medium, comprising software instructions that when executed by a computer, causes the computer to perform the operations of: receiving a request submitted by a user to access data entries stored at a primary data server; determining whether the received request is supported by a fast query service engine, the fast query service engine being different from the primary data server; in response to determining that the received request is supported by the fast query service engine, directing the request to the fast query service engine; receiving query results from the fast query service engine, the query results composed from more than one answer sets maintained in in-memory data store at the fast query service engine, the answer sets the in-memory data-store being synchronized with the primary data server; and providing the query results to the user submitting the request.

Implementations may include one or more of the following features. In one configuration, determining whether the received request is supported by the fast query service may include decomposing the received request into logic query segments; and determining whether corresponding answer sets of the decomposed logic query segments are maintained in in-memory data storage at the fast query service engine. Decomposing the received request may include: decomposing the received request into logic query segments nested by at least one conjunctive. Decomposing the received request may include: decomposing the receive request into logic query segments nested by at least one disjunctive. Decomposing the received request may include: decomposing the receive request into logic query segments nested by at least one negation.

In one configuration, the operations may additionally include: in response to determining that the request is not supported by the fast query service engine, directing the request to the primary data server. The operations may further include: determining whether the request modifies data on the primary data server. Moreover, the operations may include in response to determining that the request modifies data on the primary data server, notifying the fast query service engine that contents of answer set referencing the modified data, as maintained in in-memory data store at the fast query service engine, has become invalid.

In still another aspect, some implementations may provide a method for query handling, the method including: receiving a forwarded query, the query submitted by a user to access data on a primary data server; determining whether corresponding answer sets to components of the forwarded query are available in in-memory data store; in response to determining that the corresponding answer sets are available, further determining whether the corresponding answer sets are valid; in response to determining that the corresponding answer sets are available and valid, composing query results based on the corresponding answer sets to components of the query; and providing the query results to respond to the query submitted by the user.

Implementations may include one or more of the following features. The method may further include receiving an invalidation notice regarding data being modified by a user-submitted query, the data being referenced by at least one answer set maintained in the in-memory data storage. The method may additionally include registering the at least one answer set referencing the modified data as invalid. The method may also include removing the at least one answer set from the in-memory data store. The method may further include updating contents of the at least one answer set as stored in the in-memory data storage.

The method may further include in response to determining that the corresponding answer sets are available but at least one answer set is invalid, refraining from composing the query results until contents of the at least one answer set, as stored in the in-memory data storage, has been synchronized with corresponding data in the primary data server. The method may further include expediting updating contents of the at least one answer set as stored in the in-memory data storage. The method may additionally include dispatching an update request to update the contents of the at least one answer set as stored in the in-memory data storage. Dispatching the update request may include: dispatching an update request to fetch the updated contents from the primary data server. The method may further include: in response to determining that the corresponding answer sets are available but at least one answer set is invalid, providing feedback indicating that the query results of the forwarded query is being blocked.

In yet another aspect, some implementations may provide a computer system for query handling. The computer system may include one processor configured to perform the operations including: receiving a forwarded query, the query submitted by a user to access data on a primary data server; determining whether corresponding answer sets to components of the forwarded query are available in in-memory data store; in response to determining that the corresponding answer sets are available, further determining whether the corresponding answer sets are valid; in response to determining that the corresponding answer sets are available and valid, composing query results based on the corresponding answer sets to components of the query; and providing the query results to respond to the query submitted by the user.

Implementations may include one or more of the following features. The operations may further include receiving an invalidation notice regarding data being modified by a user-submitted query, the data being referenced by at least one answer set maintained in the in-memory data storage. The method may additionally include registering the at least one answer set referencing the modified data as invalid. The operations may also include removing the at least one answer set from the in-memory data store. The operations may further include updating contents of the at least one answer set as stored in the in-memory data storage.

The operations may further include in response to determining that the corresponding answer sets are available but at least one answer set is invalid, refraining from composing the query results until contents of the at least one answer set, as stored in the in-memory data storage, has been synchronized with corresponding data in the primary data server. The operations may further include expediting updating contents of the at least one answer set as stored in the in-memory data storage. The operations may additionally include dispatching an update request to update the contents of the at least one answer set as stored in the in-memory data storage. Dispatching the update request may include: dispatching an update request to fetch the updated contents from the primary data server. The operations may further include: in response to determining that the corresponding answer sets are available but at least one answer set is invalid, providing feedback indicating that the query results of the forwarded query is being blocked.

In yet still another aspect, some implementations may provide a computer-readable medium, including software instructions, that when executed by a computer processor, causes the computer processor to perform the operations of: receiving a forwarded query, the query submitted by a user to access data on a primary data server; determining whether corresponding answer sets to components of the forwarded query are available in in-memory data store; in response to determining that the corresponding answer sets are available, further determining whether the corresponding answer sets are valid; in response to determining that the corresponding answer sets are available and valid, composing query results based on the corresponding answer sets to components of the query; and providing the query results to respond to the query submitted by the user.

Implementations may include one or more of the following features. The operations may further include receiving an invalidation notice regarding data being modified by a user-submitted query, the data being referenced by at least one answer set maintained in the in-memory data storage. The method may additionally include registering the at least one answer set referencing the modified data as invalid. The operations may also include removing the at least one answer set from the in-memory data store. The operations may further include updating contents of the at least one answer set as stored in the in-memory data storage.

The operations may further include in response to determining that the corresponding answer sets are available but at least one answer set is invalid, refraining from composing the query results until contents of the at least one answer set, as stored in the in-memory data storage, has been synchronized with corresponding data in the primary data server. The operations may further include expediting updating contents of the at least one answer set as stored in the in-memory data storage. The operations may additionally include dispatching an update request to update the contents of the at least one answer set as stored in the in-memory data storage. Dispatching the update request may include: dispatching an update request to fetch the updated contents from the primary data server. The operations may further include: in response to determining that the corresponding answer sets are available but at least one answer set is invalid, providing feedback indicating that the query results of the forwarded query is being blocked.

Implementations of the above techniques include a method, computer program product and a system. The computer program product is suitably embodied in a non-transitory machine-readable medium and includes instructions executable by one or more processors. The instructions are configured to cause the one or more processors to perform the above described actions.

The system includes one or more processors and instructions embedded in a non-transitory machine-readable medium that are executable by the one or more processors. The instructions, when executed, are configured to cause the one or more processors to perform the above described actions. The default position is not to use any external databases, but the system could be configured to perform a database check if needed.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 4B shows an example user interface showing the status of answer sets maintained at in-memory data store 106 according to some implementations.

FIG. 4C shows an example user interface for a system administrator to integrate a back-end fast query service engine within a front-end application running a fast query wrapper, according to some implementations.

DETAILED DESCRIPTION

This disclosure generally describes systems and methods for providing fast query results to user-generated questions. The query results can be generated faster than direct processing by a relational database. The relational database may be coupled to a primary data server. The user-generated question may include several logical segments. In some implementations, answer sets to the logical segments of a particular user-generated question may be maintained at high-performance in-memory data storage as a form of caching. Query results may be composed from the answer sets "cached" at in-memory data storage. The composition can provide query results faster than when the answer sets need to be fetched from the primary data server, for example, through query processing by a traditional relational database. Contents of the answer sets may be maintained consistent with the corresponding data in the primary data server. For example, when the corresponding data is being modified, contents of the impacted answer sets may be invalidated or updated. The update may take the form of synchronization between the in-memory data storage and the primary data server.

Figure 1:
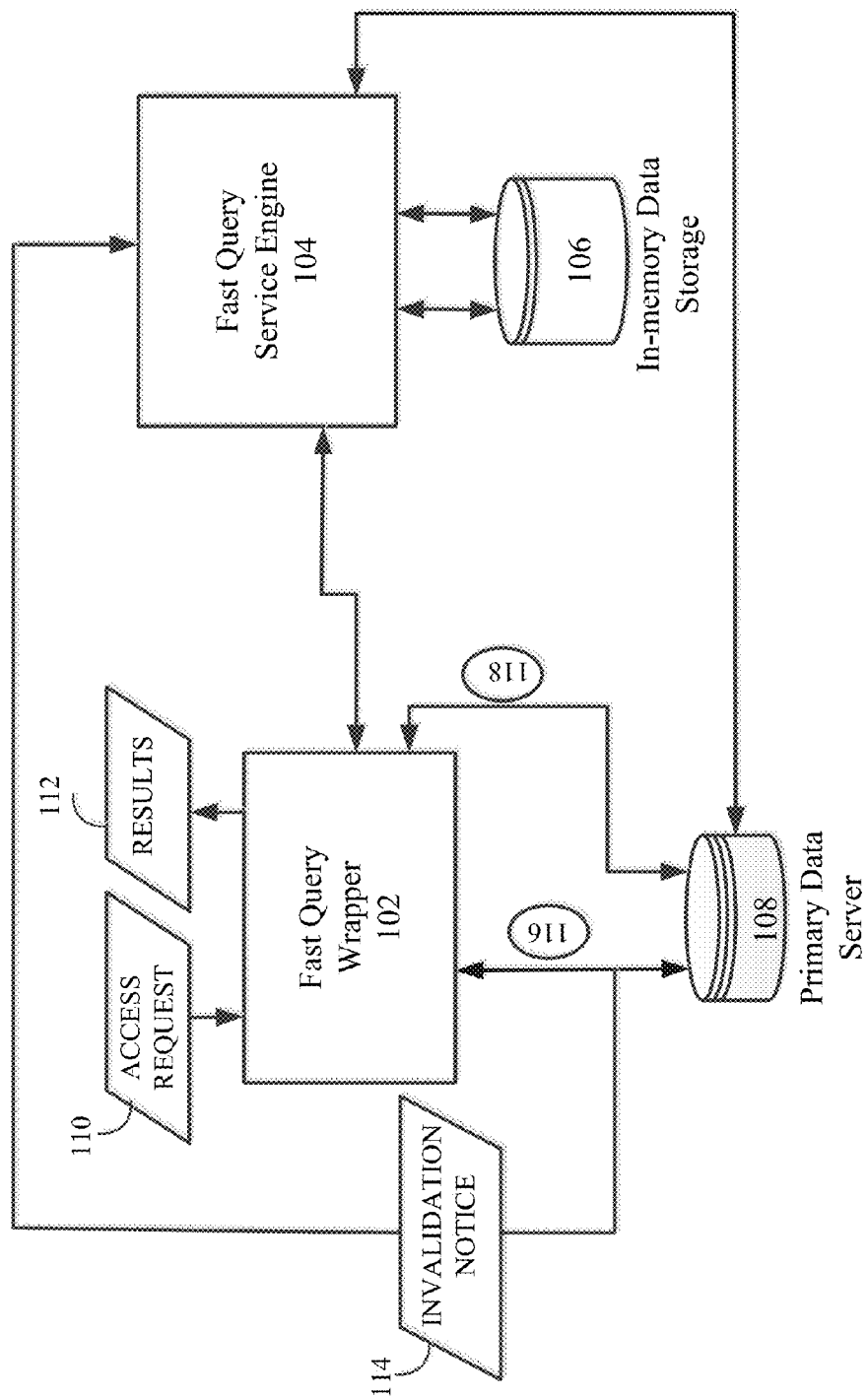
FIG. 1 is a diagram showing a system according to some implementations to provide fast query response to user-generated questions.

FIG. 1 is a diagram showing a system according to some implementations to provide fast query response to user-generated questions. The system may include a fast query wrapper 102, a fast query service engine 104, and an invalidation notice loop. The fast query wrapper (FQW) 102 may serve as a front-end engine. The front-end engine may receive user-generated data access request 110, including read/query request and write/non-query request. FWQ 102 may provide user who submitted data access request 110 with results 112. Data access request 110 may include business-level questions generated by a human user. Data access request 110 may also include high-level questions parsed by a machine using natural language processing, for example, a search engine service driven by a voice recognition subsystem, a search engine service partially driven by prior questions generated by the same user, etc. Generally, the front-end engine may provide an interface to user-generated questions at the business level. The user-generated questions may not specific to, or restricted to, queries formulated in a particular query language, such as, for example, Structured Query Language (SQL). In fact, the user-generated questions may not even be restricted by the interfacing language (such as, for example, PHP or Python) to a specific SQL database.

Fast query wrapper (FQW) 102 may decompose the user-generated data access request 110, for example, a query, into logic query segments. In some implementations, a user-generated query may be divided into logic query segments by operations in the nature of set algebra calculations. Algebra of set may generally include Boolean algebraic operations including join operations (e.g., union), meet operations (e.g., intersection), complement operations (e.g., complement or negation), etc. In some implementations, the user generated query may be decomposed into query segments joined by disjunctives, conjunctives, negations, or combinations of disjunctives, conjunctives, or negations. For example, negation may be enabled by maintaining the universal set U, of all unique identifiers for a given query entity. Then, if a query is submitted with a constraint ~A, the query may be processed based on the stored result A by computing U-A. Other set algebra operations may be performed in a similar fashion to simplify the access request so that the access request may be processed more efficiently. The decomposition or optimization may reduce the amount of time for fast query wrapper (FQW) 102 to engage primary data server 108 to process a user-generated data access request 110, for example, a query. As noted above, the user-generated query can include a high-level or business level question, and may not be limited to a structured query (e.g., a query formulated in SQL). In response to the query as submitted by the user, some implementations may provide fast query service through fast query service (FQS) engine 104.

Fast query service (FQS) engine 104 may serve as a back-end engine while fast query wrapper (FQW) 102 functions as a front-end engine. Fast query service (FQS) engine 104 may include in-memory data storage 106. In-memory data storage 106 may include memory device with fast data access time, such as, for example, dynamic random-access memory (DRAM), static random-access memory (SRAM), non-volatile memory random-access memory (NVRAM), etc. In-memory data storage 106 may not include storage media with mechanically rotating parts, including, for example, scanning arms of a hard disk drive, scanning head of an optical storage device, etc. Such storage media can lead to data access latencies longer than storage media without mechanically rotating parts. Contents of answer sets to various queries or query segments may be stored in the in-memory data store. In some implementations, fast query service engine 104 may provide contents of answer sets to fast query wrapper (FQW) 102 such that fast query wrapper (FQW) 102 may compose query results from the provided answer sets. As discussed herein, memory access time associated with the in-memory data store tends to be faster than memory access time associated with the primary data server 108. Thus, composing query results based on contents of answer sets already stored in the in-memory data store may lead to fast response time to a user-generated query. In some scenarios, some answer sets may be pulled from in-memory data store 106 while others may be fetched from primary data server 108. The expected latency in generating query results may still be reduced compared to scenarios in which the entire answer sets may be pulled from primary data server 108. Fast query service, as discussed herein, may include the benefit of the reduced latency in providing query results.

At the same time, fast query service (FQS) engine 104 may communicate with primary data server 108. Primary data server 108, for example, may host a relational database management system (DBMS). Example DBMS may include a MySQL database, a PostgreSQL database, an Oracle database, etc. In contrast to in-memory data storage 106, primary data server 108 may include storage devices with rotational mechanical parts, such as hard disk drives, magnetic tapes, optical disk storage (e.g., compact disc, digital videodisk, blue-ray, etc.). Storage media on primary data server 108 may have a lower price per storage unit. Primary data server 108 may have a storage capacity larger than that of the in-memory data storage on FQS 104. However, primary data server 108 may have a slower memory access time, compared to in-memory data store 106. As noted above, some implementations may provide faster response time to a user-generated data access request 110 by composing query results based on answer sets already stored at in-memory data store 106. Moreover, as discussed herein, the contents of answer sets maintained at in-memory data store 106 may be kept consistent with corresponding data on primary data server 108. Hence, some implementations may provide results, for example fast query results, without compromising consistency.

Specifically, an invalidation loop may enforce the consistency between contents of answer sets stored at in-memory data store 106 and at primary data server 108. As shown in FIG. 1, in receiving user-generated data access request 110, fast query wrapper 102 may submit the access request to primary data server 108. Sometimes, the access request can include an operation in the nature of a write operation (116). Sometimes, the access request may include an operation in the nature of a read operation (118). When the submitted request include an operation in the nature of a write operation, the corresponding data on primary data server 108 may be modified. Such request may include a request to modify/update a data entry, a request to create a data entry, etc. On the other hand, when the request is the nature of a read operation, the requested data itself on primary data server 108 may not be altered. However, related data, such as a counter indicating the number times the requested data has been accessed, may still be updated. The modification status may trigger primary data server 108 to send invalidation notice 114 to fast query service (FQS) engine 104. Invalidation notice 114 may refer to the specific portion of data that has been or is being modified on primary data server 108. Invalidation notice 114 may be received by fast query service engine 104. In response to receiving the invalidation notice 114, fast query service (FQS) engine 106 may take actions to maintain consistency between contents of answer sets stored at in-memory data store 106 and the corresponding data as stored on primary data server 108. In one configuration, FQS engine 106 may mark a contents registry table to note the status of answer sets referring to the modified data referenced by the invalidation notice as invalid. In another configuration, FQS engine 104 may purge the answer sets referring to the modified data from in-memory data store 106. In yet another configuration, FQS engine 104 may proactively fetch updated answer sets from primary data server 108 to replace the answer sets referring to the modified data. While FQS engine 104 takes the actions to maintain data consistency between contents of answer sets stored at in-memory data store 106 and the corresponding data as stored on primary data server 108, FQS engine 104 may block access requests forwarded from fast query wrapper (FQW) 102 to access the answer sets impacted by the invalidation notice 114. For example, user-generated queries attempting to access the answer sets impacted by invalidation notice 114 may receive a block message that service is "temporarily unavailable." The block may be in effect while FQS engine 104 is marking the impacted answer sets as invalid, removing the answer sets, or updating the answer sets. When FQS engine 104 is done with marking, removing, or updating, FQS engine 104 may respond to the forwarded access request accordingly. For example, FQS engine 104 may alert FQW 102 that the impacted answer sets are invalid, or contents of the impacted answer sets have become unavailable. When the contents of the impacted answer sets have been updated, FQS engine 104 may provide FQW 102 with updated answer sets consistent with the corresponding data, as modified and stored on primary data server 108.

In summary, using invalidation notice 114, distributed transaction that spans over the primary data server 108 and the in-memory data store 106 may be implemented with data consistency enforced. In some implementations, the back-end FQS engine 104 may be configured to be collated with primary data server 108, for example, a core data server running MySQL or an Oracle DBMS. The front-end fast query wrapper (FQS) may be implemented as a thin client layer integrated into the application to interact with users who may be submitting data access requests 110 on-line or from a mobile application.

Figure 2:
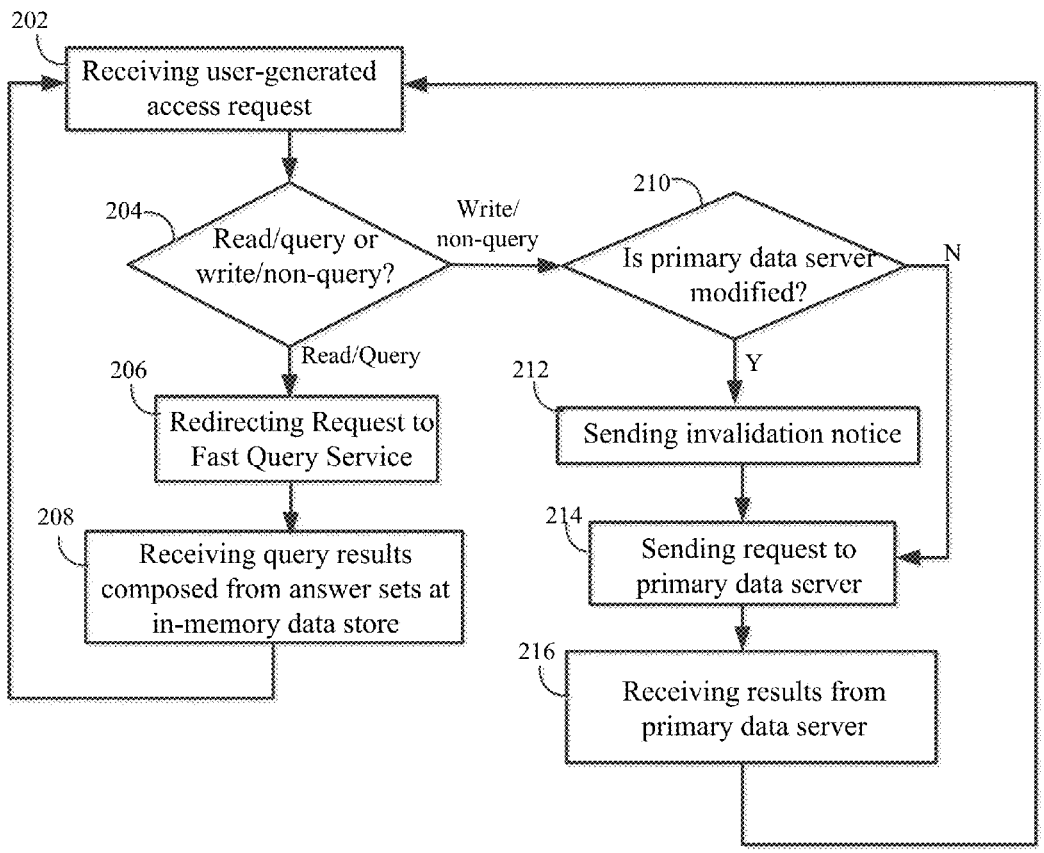
FIG. 2 shows an example work flow of a handling user-generated question according to some implementations.

FIG. 2 shows an example work flow of handling user-generated access requests according to some implementations. In some implementations, FIG. 2 may be mapped to a front-end fast query wrapper (FQW) 102. Initially, a user-generated access request 110 may be received (202). The user-generated access request may be submitted by the user on a mobile computing device, including, for example, a smartphone, a tablet, a laptop, etc. The user may submit the access request using a mobile app downloaded from an app store. As noted above, the user-generated access request may include high-level question submitted by the user. The user-generated access request may include query not necessarily formulated in a specific language, such as SQL.

The user-generated access request may be submitted by a user through a web-portal provided by a web server, for example, an Apache web server. The web-portal may include a server-side application program written in, for example, a scripting language such as PHP or Python. The server-side application program may implement the front-end fast query wrapper (FQW) 102. As discussed above, front-end FQW 102 may function as client wrapper to interact with fast query service engine 104 (as the back-end)

and primary data server 108 (as the core data server). In some implementations, front-end fast query wrapper (FQW) 102 may interact with back-end fast query service (FQS) engine 104 according to a client/server architecture. In one configuration, FQW 102 and FQS engine 104 may follow a distributed client/server paradigm. FQW 102 and FQS engine 104 may not be collated on the same physical machine. FQW 102 and FQS engine 104 may be included in a cloud-computing environment to provide the user with seamless access to query results, with improved response latency and enforced data consistency.

If user-generated access request include a query, FQW 102 may determine whether the user-generated data access request is a read/query or a write/non-query request (204). When the data access request is in the nature of a read/query, the request may be processed by fast query service. As discussed herein, fast query service may render query results with reduced latency while maintaining data consistency. To be eligible for fast query processing, the user-generated query may be decomposed into logic segments and answer sets to some logic segments may be stored at in-memory data store. In some implementations, FQW may keep a status map indicating whether a particular logic segment has an answer set pre-stored at in-memory data store 106. In one configuration, the status map may be populated by, for example, a separate and dedicated service thread. The separate thread may traverse in-memory data storage to identify the available answer sets already "cached." In one configuration, the separate thread may be launched when the load on FQW 102 and FQS engine 104 is relatively low. Moreover, the thread may scan the in-memory data store 106 for available answer sets on an incremental basis, i.e., scan only the portions that have changed since last scan. In one configuration, the thread may even be launched reactively when an answer set on in-memory data storage 106 has been updated.

When FQW 102 determines that the user-generated query is a read/query request, FQW 102 may redirect the user-generated query to fast query service (FQS) engine 104 (206). In one configuration, the redirected query may be sent to FQS engine 104 in the form of the decomposed logic segments, in the particular, the logic segments with answer sets already stored at in-memory data store 106. In another configuration, the redirected query may be sent to FQS engine 104 for the FQS engine 104 to decompose into logic segments.

In response to the redirected query, FQW 102 may receive query results from FQS engine 104 (208). In some scenarios, the received query results may be composed by FQS engine 104 based on answer sets already stored at in-memory data store 106. As noted above, the answer sets maintained at in-memory data store 106 may be kept consistent with the corresponding data on primary data server 108. In other scenarios, composing query results may be performed, at least in part, by FQW 102. In such scenarios, answer sets to some logic segments of the user-generated query may be unavailable at in-memory data storage 106. Answer sets may be unavailable at in-memory data store 106 for a variety of reasons. For example, answer sets may not yet have been fetched from primary data server 108, or answer sets may be purged from in-memory data store 106 in response to an invalidation notice 114, or answer sets may be invalidated in response to an invalidation notice 114, as discussed above. In such scenarios, the answer sets unavailable at in-memory data storage 106 may need to be obtained from primary data server 108. When data corresponding to the unavailable answer sets are returned from primary data server 108, query results may be composed accordingly. In some implementations, FQW 102 may be configured to obtain the unavailable answer sets from primary data server 108. In other implementations, however, the FQS engine 104 may be adapted to obtain the unavailable answer sets from primary data server 108 so that the contents of such answer sets may become available for subsequent user-generated queries that may need a "cached" copy of the answer sets for fast responses. Composing the query results based on the answer sets, already stored at in-memory data storage 106 and newly obtained from primary data server 108, may be performed by FQS engine 104 or FQW 102.

If, however, FQW 102 determines that the user-generated access request is in the nature of a write/non-query request, then FQW 102 may proceed to determine whether data on primary data server 108 will be modified by the user-generated access request (210).

If data on primary data server 108 will be modified by the user-generated access request (210), an invalidation notice 114 may be generated and sent to notify fast query service (FQS) engine 104 (212). The invalidation notice 114 may trigger FQS engine 104 to mark the answer sets referencing the modified data as invalid, purge such answer sets from in-memory data store, or obtain updated answer sets, as discussed herein and in accordance with a distributed transaction implementation. Thereafter, the request may be sent to primary data server 108 (214).

If data on primary data server 108 will not be modified by the user-generated access request (210), the process may proceed to send the request to primary data server 108 (214).

When results have been received from primary data server 108 (216), FQW 102 may proceed to receive additional user-generated access requests (202). In other words, in serving user-generated access request, FQW 102 may adopt a blocking approach (sometimes known as synchronized approach) to ensure consistency of data being maintained at in-memory data store 106 and data stored at primary data server 108. The blocking approach may implement part of the distributed transaction feature, as discussed herein.

In some scenarios, answer set to a particular logic segment of the access request may not have been "cached" at in-memory data store, for example, when answer set to the particular the logic segment becomes unavailable, invalid, or purged from in-memory data store 106. In such scenarios, contents of the corresponding answer set may be obtained from primary data server 108. To this end, the particular logic segment may be rerouted to primary data server 108. In some implementations, the rerouted logic segment may be reformulated in, for example, a structured query language (SQL), to facilitate query processing at primary data server 108. In response to the rerouted logic segment, the corresponding answer set may be received. Based on received the answer sets (from in-memory data store 106 and primary data server 108), query results may be composed in accordance with the description herein. Composed query results may be relayed to the user who had submitted the user-generated query.

Figure 3A:
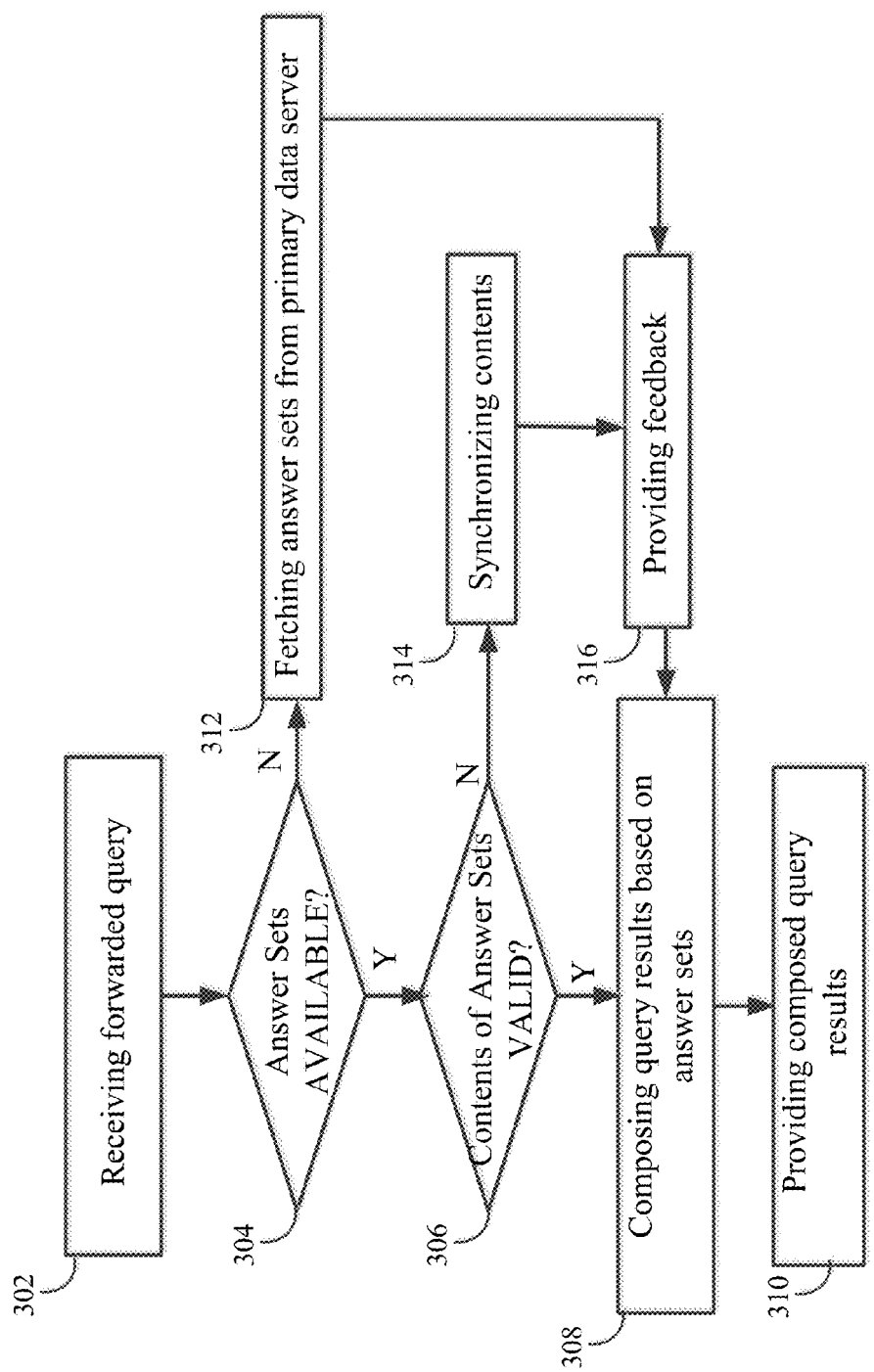
FIG. 3A shows an example work flow of generating query results based on answer sets synchronized with data sets according to some implementations.

FIG. 3A shows an example work flow of generating query results based on answer sets synchronized with data sets according to some implementations. In some implementations, FIG. 3A may be mapped to a back-end fast query service (FQS) engine 104. Initially, a forwarded query may be received from FQW 102. As discussed herein, the forwarded query may be in the form of decomposed logic segments. If the forwarded query is not in the form of decomposed logic segments, FQS engine 104 may decompose the received query into logic segments.

FQS engine 104 may determine if answer sets to the logic segments are available at in-memory data store 106 (304). If any answer set has not been "cached" at in-memory data store 106, FQS engine 104 may query primary data server 108 to fetch such unavailable answer set. While such answer sets are being obtained from primary data server 108, feedback information may be provided to FQW 102 (316) to indicate, for example, status information regarding the answer sets.

If all answer sets have been "cached" at in-memory data store 106, FQS engine 104 may then determine if the contents of the answer sets are valid. As discussed herein, contents of answer sets may be invalid because, for example, the corresponding data on primary data server 108 has been modified. In some implementations, FQS engine 104 may include a content registry to keep track of the validity status of the corresponding data on primary data server 108. For example, the validity status of a particular answer set may be looked up in the content registry. The content registry may be maintained up to date with each invalidation notice 114, in accordance with the discussions herein.

If FQS engine 104 determines that the contents of a particular answer set has been invalidated because, for example, the corresponding data on primary data server 108 has been modified and the "cached" copy at the in-memory data store has become stale, then FQS engine 104 may update contents of the impacted answer set by synchronizing copies of data on primary data server 108 and in-memory data store 106 (314). In some implementations, FQS engine 104 may include an update scheduler adapted to launch an update service thread to obtain updated data from primary data server 108. In one configuration, the update scheduler may be configured to launch the update service thread when the load on FQS engine 102 is relatively low, for example, under 80%. In some configurations, the update scheduler may be configured to launch the update service thread proactively, for example, by predictively fetching. For example, the update service thread may be configured to "speculatively" predict data segments that may be needed by subsequent user-generated queries according to data access patterns exhibited by prior user-generated queries. The prediction may follow, for example, a linear extrapolation algorithm based on the logic address of data being accessed. While the contents of the impacted data set are being updated, feedback information may be provided to FQW 102 to indicate the update state (316). After the synchronization, the content registry on FQS engine 104 may be updated to reflect the validity status of the updated answer set.

In some implementations, FQS engine 104 may compose query results based on the answer sets (308). Thereafter, the composed query results may be provided to user through FQW 102. Thus, the divide-and-conquer strategy, coupled with the in-memory data store 106 to "cache" answer sets, may yield fast query results based on data consistent with primary data server 108.

Figure 3B:
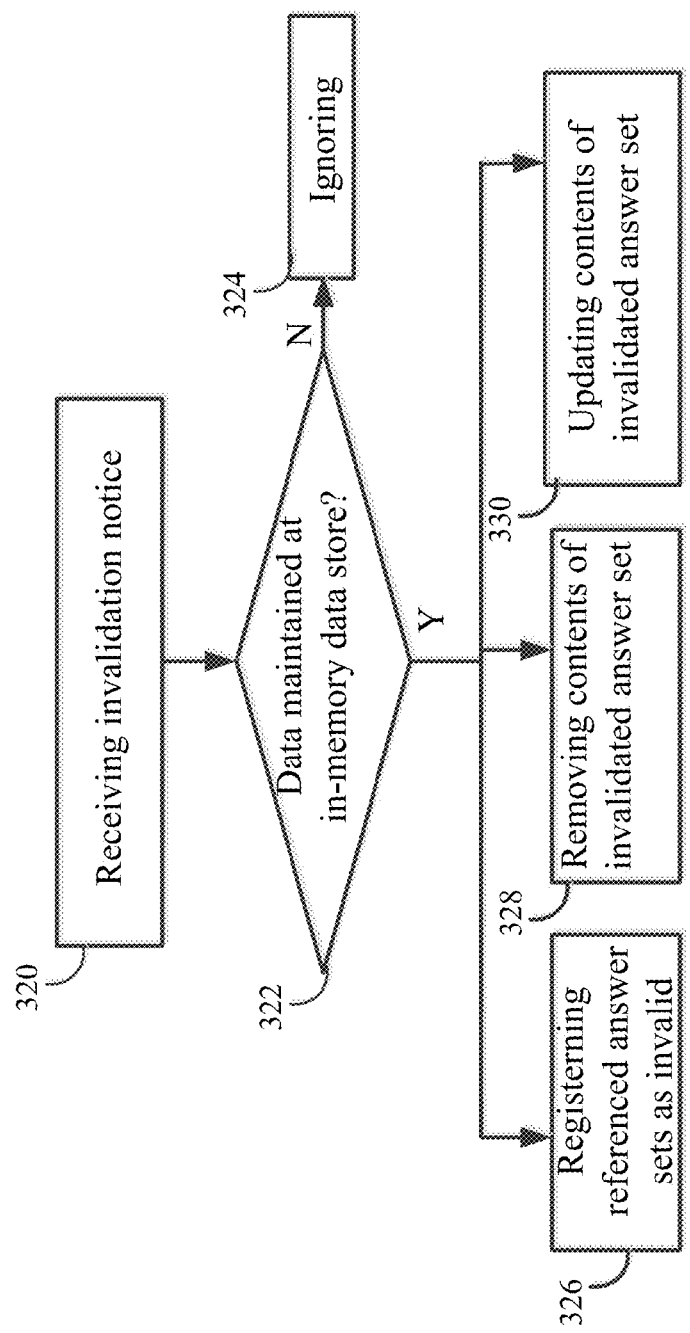
FIG. 3B shows an example work flow of handling an invalidation notice according to some implementations.

FIG. 3B shows an example work flow of handling an invalidation notice according to some implementations. An invalidation notice 114 may be received at FQS engine 104 (320). In response, FQS engine 104 may determine if the modified data has a copy being maintained at the in-memory data store 106 (322). If the modified data is not yet maintained at the in-memory data store 106, then FQS engine 104 may choose to ignore the invalidation notice (324).

If, however, the modified data is being maintained at in-memory data store 106, FQS engine 106 may choose to register the answer set referencing the modified data as invalid (326), remove the contents of the impacted answer set from in-memory data store 106 (328), or update contents of the impacted answer set as stored at in-memory data store 106 (330).

In some implementations, FQS engine 104 may include a content registry configured to track the validity status of answer sets stored at in-memory data store 106 based on the corresponding data on primary data server 102. In response to an invalidation notice invalidating answer sets referencing modified data, the content registry may be updated to mark the impacted answer sets as invalid.

In other implementations, FQS engine 104 may include a memory manager configured to maintain answer sets stored at in-memory data store 106. In response to an invalidation notice invalidating answer sets referencing modified data, the memory manage may be to remove contents of the impacted answer sets from in-memory data store 106.

In still other implementations, FQS engine 104 may be configured to handle invalidated data more diligently. For example, an update scheduler may be invoked to obtain updated answer sets based on modified data from primary data server 108.

For context, cloud computing and big data are rendering healthcare data, in electronic form, to grow larger and more ubiquitous. In part, the growth in data size and the improvement in data access may be facilitated by hardware improvements in speed and capacity of mass storage devices, as well as similar advances in processor and networking speed. Healthcare databases may be partitioned in large tables across a cluster of separate database servers with diverse storage technologies. For example, network-attached storage (NAS) and storage area networks (SANs) coupled with fast local area networks and Fiber Channel technology enable still larger, more loosely coupled configurations of databases and distributed computing power. Example implementations of distributed database storage may include X/Open XA standard and Oracle RAC relies, both of which employs high-speed network connections between data storage servers. In the context of describing data storage technologies, server, system, and device may be used interchangeably.

For healthcare data in the age of cloud computing, the healthcare may be more likely managed by a host of different or heterogeneous database management systems. These database management systems may be hosted on servers spanning over a wide region. Thus, a monolithic solution to rely on a traditional database management system to provide "cached" data to subsequent queries may not be realistic. Furthermore, even if a monolithic solution may be implemented for a particular application context, the solution may not provide lock in the user to a particular database engine and impede portability of the solution. In contrast, a modularized solution can provide the aforementioned performance improvement without incurring the expense and the loss or portability of monolithic solutions. Nonetheless, the distinguishing characteristics of a layered or modularized solution as disclosed herein are far from being obvious. In fact, the sheer complexity of implementing a distributed transaction with a modularized system is so daunting that no one has tackled such implementation.

Figure 4A:
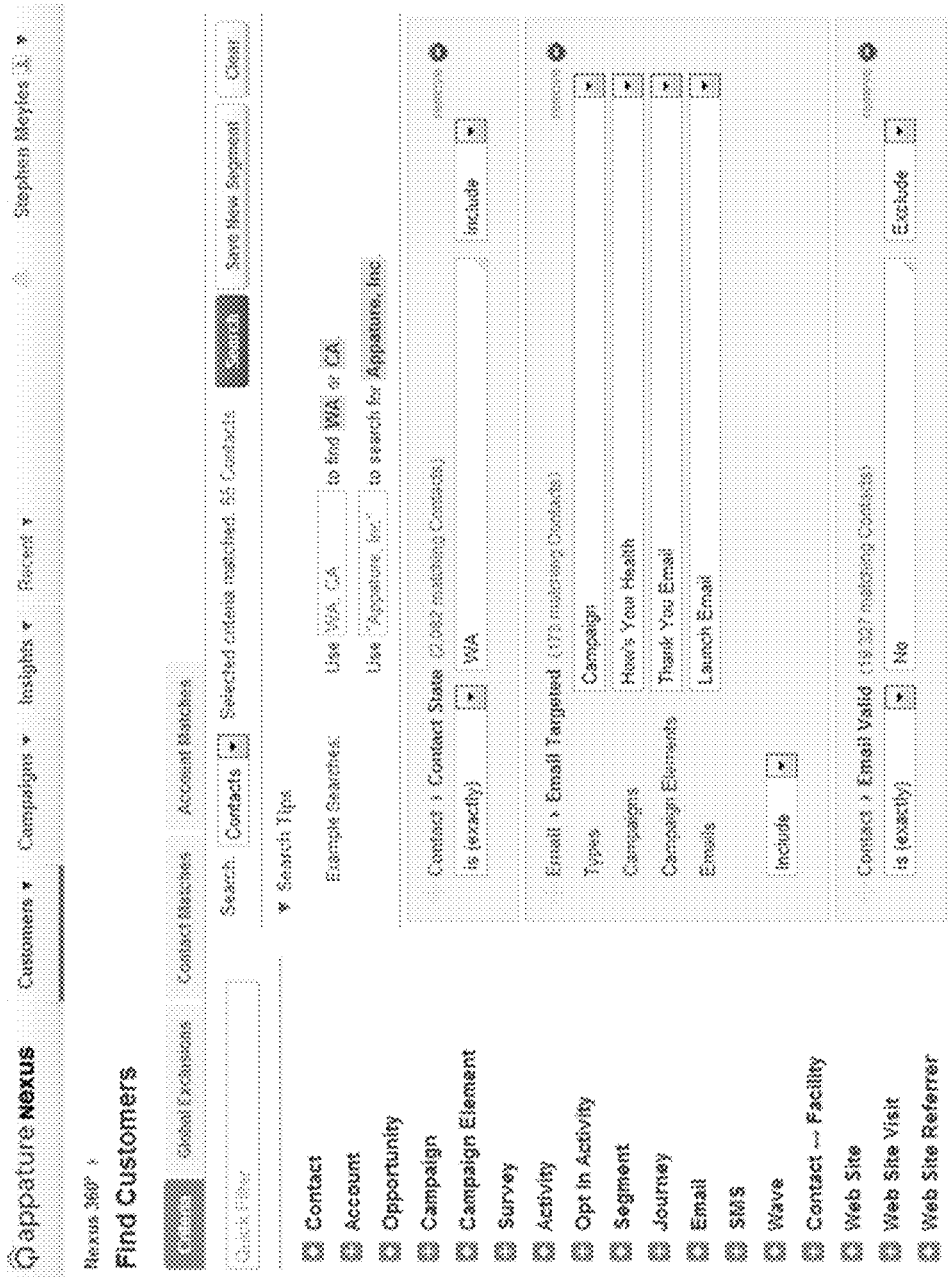
FIG. 4A shows an example user interface for receiving user-generated questions and providing query results according to some implementations.

FIG. 4A shows an example user interface for receiving user-generated questions and providing query results according to some implementations. As illustrated, three decomposable query components (or logic segments), namely, contact state, email being targeted, and contact email being valid, form an implicit conjunctive statement. The three logic segments combine to form the criteria for the search. One of the three logic segments, namely, the logic segment about target email being valid, may include an exclusion criterion. The exclusion criterion may be subject to interpretation as subtracting the included criterion from the universal set (i.e., U-A) instead of a negated criterion (i.e., ~A) directly. In some implementations, user-generated query may be decomposed into logic segments combinable by disjunctives.

Figure 4B:
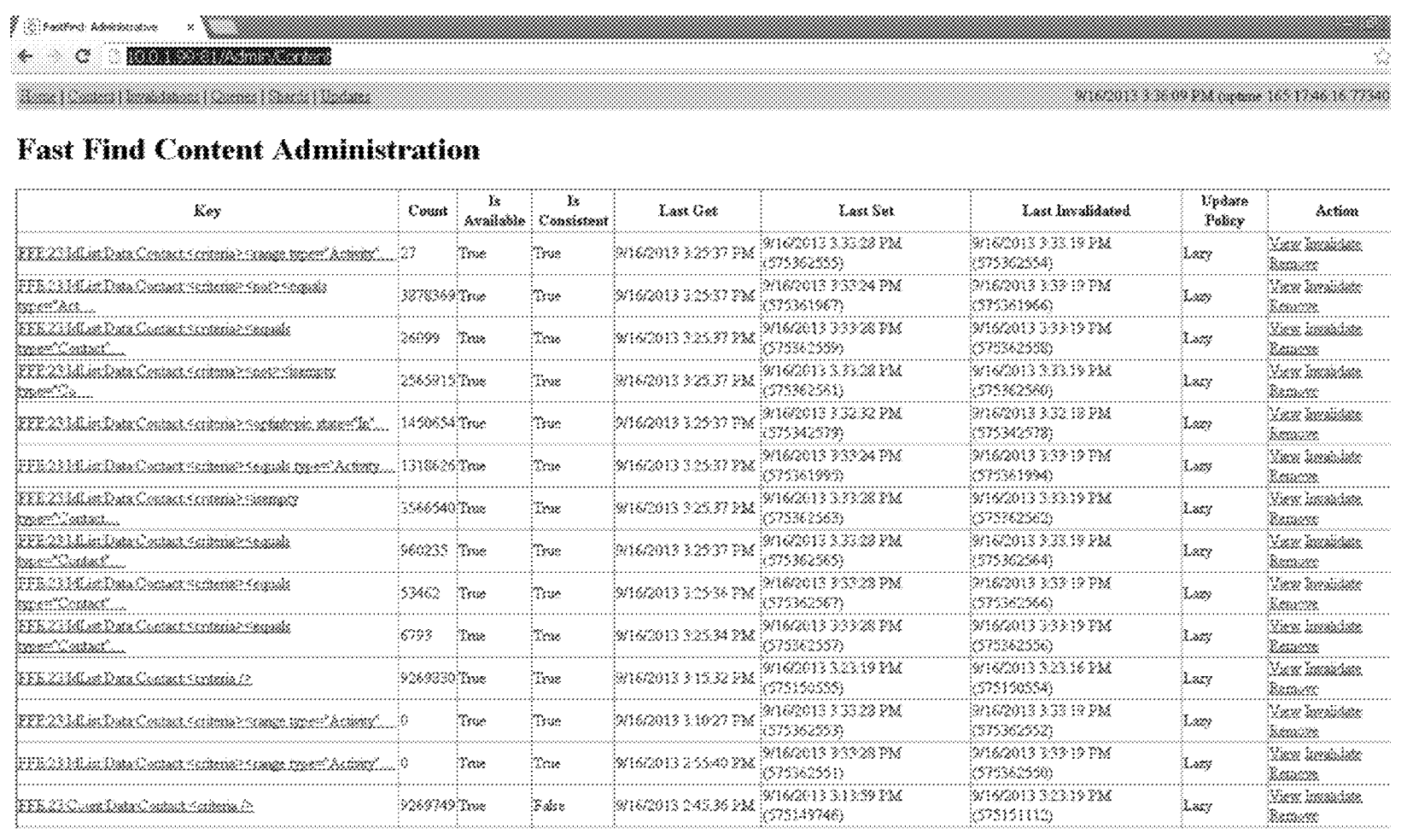

FIG. 4B shows an example user interface showing the status of answer sets maintained at in-memory data store 106 according to some implementations. The status view may be available for a system administrator on the fast query service (FQS) engine 104. As discussed herein, FQS engine 104 may form the back-end of the fast query service and may include in-memory data store 106. As illustrated in FIG. 4B, for each key value referring to available answer sets maintained at data store 106, the table shows the number of counts (indicating the number of times when the keyed entry has been accessed), whether the keyed entry is available, whether the keyed entry is consistent with the corresponding data on primary data server 108, the time stamp for when the keyed entry was last read in a get operation, the time stamp for when the keyed entry was last modified in a set operation, the time stamp when the keyed entry was last invalidated, the update policy, and actions available to the system administrator regarding the particular keyed entry. The update policy may include lazy (for example, merely marking the contents as invalid), neutral (for example, removing contents from in-memory data store), or diligent (for example, proactively refresh contents of invalidated answer sets). As illustrated, the actions available to the system administrator may include viewing the contents of the keyed entry, marking the contents of the keyed entry as invalid, and removing the contents of the keyed entry from in-memory data store.

FIG. 4C shows an example user interface for a system administrator to integrate a back-end fast query service engine within a front-end application running a fast query wrapper, according to some implementations. As illustrated, the user interface may allow a machine group to accept fast query service requests from a particular Internet protocol (IP) address. The fast query service may include both read and write accesses. Moreover, the fast query wrapper, as a thin layer of application, may functions as a client to engage a fast query service engine as a fast find server.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS)

receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combinations.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

The invention claimed is:

1. A method for handling data access request, comprising:
receiving a semantic request submitted by a user to access data entries stored at a primary data server running a relational database management system (DBMS);
decomposing the received request into logic query segments, each logic query segment having a corresponding answer set retrievable from the primary data server based on a DBMS query formulated based on the logic query segment;
determining whether a corresponding answer set of a particular decomposed logic query segment is stored and ready in an in-memory data storage at the fast query service engine such that a DBMS query submission at the primary data server is obviated, the fast query service engine being different and separate from the primary data server;
in response to determining that a corresponding answer set of a particular decomposed logic query segment is not stored in the in-memory data storage at the fast query service engine, formulating a DBMS query based on the particular decomposed logic query segment and fetching answer set of the particular logic query segment from the primary data server;

in response to determining that a corresponding answer set of a particular decomposed logic query segment is stored but invalid in the in-memory data storage at the fast query service engine, formulating a DBMS query based on the particular decomposed logic query segment and updating contents of the answer set by synchronizing copies of data on the primary data server and in the in-memory data storage;

in response to determining that the corresponding answer set of a particular decomposed logic query segment is stored and ready in the in-memory data storage at the fast query service engine, directing the logic query segment to the fast query service engine and retrieving an answer set of the particular decomposed logic query segment from the in-memory data storage at the fast query service engine;

composing query results from the answer set received from the primary data server and the answer set retrieved from the in-memory data storage at the fast query service engine; and providing the composed query results to the user submitting the semantic request.

2. The method of claim 1, wherein decomposing the received request comprises: decomposing the received request into logic query segments nested by at least one conjunctive.

3. The method of claim 1, wherein decomposing the received request comprises: decomposing the receive request into logic query segments nested by at least one disjunctive.

4. The method of claim 1, wherein decomposing the received request comprises: decomposing the receive request into logic query segments nested by at least one negation.

5. The method of claim 1, further comprising:
determining whether the request modifies data on the primary data server.

6. The method of claim 5, further comprising:
in response to determining that the request modifies data on the primary data server, notifying the fast query service engine that contents of an answer set referencing the modified data, as maintained in the in-memory data storage at the fast query service engine, has become invalid.

7. The method of claim 1, further comprising:
receiving a subsequent request submitted by a user;
determining that the subsequent request modifies data referenced by an answer set that is cached in the in-memory data storage at the fast query service engine; and
issuing an invalidation notice to the fast query service engine such that the answer set cached in the in-memory data storage becomes invalidated.

8. A computer system, comprising at least one processor, wherein the at least one processor is configured to perform the operations of:
receiving a semantic request submitted by a user to access data entries stored at a primary data server running a relational database management system (DBMS);
decomposing the received request into logic query segments, each logic query segment having a corresponding answer set retrievable from the primary data server based on a DBMS query formulated based on the logic query segment;

determining whether a corresponding answer set of a particular decomposed logic query segment is stored and ready in an in-memory data storage at the fast query service engine such that a DBMS query submission at the primary data server is obviated, the fast query service engine being different and separate from the primary data server;

in response to determining that a corresponding answer set of a particular decomposed logic query segment is not stored in the in-memory data storage at the fast query service engine, formulating a DBMS query based on the particular decomposed logic query segment and fetching answer set of the particular logic query segment from the primary data server;

in response to determining that a corresponding answer set of a particular decomposed logic query segment is stored but invalid in the in-memory data storage at the fast query service engine, formulating a DBMS query based on the particular decomposed logic query segment and updating contents of the answer set by synchronizing copies of data on the primary data server and in the in-memory data storage;

in response to determining that the corresponding answer set of a particular decomposed logic query segment is stored and ready in the in-memory data storage at the fast query service engine, directing the logic query segment to the fast query service engine and retrieving an answer set of the particular decomposed logic query segment from the in-memory data storage at the fast query service engine;

composing query results from the answer set received from the primary data server and the answer set retrieved from the in-memory data storage at the fast query service engine; and providing the composed query results to the user submitting the semantic request.

9. The computer system of claim 8, wherein decomposing the received request comprises: decomposing the received request into logic query segments nested by at least one conjunctive.

10. The computer system of claim 8, wherein decomposing the received request comprises: decomposing the receive request into logic query segments nested by at least one disjunctive.

11. The computer system of claim 8, wherein decomposing the received request comprises: decomposing the receive request into logic query segments nested by at least one negation.

12. The computer system of claim 8, wherein the operations further comprise:
determining whether the request modifies data on the primary data server.

13. The computer system of claim 12, wherein the operations further comprise:
in response to determining that the request modifies data on the primary data server, notifying the fast query service engine that contents of an answer set referencing the modified data, as maintained in the in-memory data storage at the fast query service engine, has become invalid.

14. The computer system of claim 8, wherein the operations further comprise:
receiving a subsequent request submitted by a user;

determining that the subsequent request modifies data referenced by an answer set that is cached in the in-memory data storage at the fast query service engine; and issuing an invalidation notice to the fast query service engine such that the answer set cached in the in-memory data storage becomes invalidated.

15. A non-transitory computer-readable medium, comprising software instructions that when executed by a computer, causes the computer to perform the operations of:

receiving a semantic request submitted by a user to access data entries stored at a primary data server running a relational database management system (DBMS);

decomposing the received request into logic query segments, each logic query segment having a corresponding answer set retrievable from the primary data server based on a DBMS query formulated based on the logic query segment;

determining whether a corresponding answer set of a particular decomposed logic query segment is stored and ready in an in-memory data storage at the fast query service engine such that a DBMS query submission at the primary data server is obviated, the fast query service engine being different and separate from the primary data server;

in response to determining that a corresponding answer set of a particular decomposed logic query segment is not stored in the in-memory data storage at the fast query service engine, formulating a DBMS query based on the particular decomposed logic query segment and fetching answer set of the particular logic query segment from the primary data server;

in response to determining that a corresponding answer set of a particular decomposed logic query segment is stored but invalid in the in-memory data storage at the fast query service engine, formulating a DBMS query based on the particular decomposed logic query segment and updating contents of the answer set by synchronizing copies of data on the primary data server and in the in-memory data storage;

in response to determining that the corresponding answer set of a particular decomposed logic query segment is stored and ready in the in-memory data storage at the fast query service engine, directing the logic query segment to the fast query service engine and retrieving an answer set of the particular decomposed logic query segment from the in-memory data storage at the fast query service engine;

composing query results from the answer set received from the primary data server and the answer set retrieved from the in-memory data storage at the fast query service engine; and providing the composed query results to the user submitting the semantic request.

16. The computer-readable medium of claim 15, wherein the operations further comprise:

in response to determining that the request is not supported by the fast query service engine, directing the request to the primary data server; and determining whether the request modifies data on the primary data server.

17. The computer-readable medium of claim 16, wherein the operations further comprise:

in response to determining that the request modifies data on the primary data server, notifying the fast query service engine that contents of an answer set referencing the modified data, as maintained in the in-memory data storage at the fast query service engine, has become invalid.

18. The computer-readable medium of claim 15, wherein the operations further comprise:

receiving a subsequent request submitted by a user;

determining that the subsequent request modifies data referenced by an answer set that is cached in the in-memory data storage at the fast query service engine;

issuing an invalidation notice to the fast query service engine such that the answer set cached in the in-memory data storage becomes invalidated.

\* \* \* \* \*